United States Patent [19]
Mori et al.

[11] Patent Number: 5,527,086
[45] Date of Patent: Jun. 18, 1996

[54] SUN-ROOF DEVICE

[75] Inventors: Keiji Mori, Kariya; Hironori Ochiai, Chiryu; Akitoshi Sometani, Okazaki, all of Japan

[73] Assignee: Aisin Seiki Kabushiki Kaisha, Japan

[21] Appl. No.: 348,969

[22] Filed: Nov. 28, 1994

[30]   Foreign Application Priority Data

Nov. 29, 1993   [JP]   Japan .................... 5-298695

[51] Int. Cl.⁶ .................................. B60J 7/057
[52] U.S. Cl. ........................ 296/223; 296/213
[58] Field of Search .................... 296/213, 223, 296/224, 221

[56]          References Cited

U.S. PATENT DOCUMENTS

| | | | |
|---|---|---|---|
| 4,293,161 | 10/1981 | Lutz | 296/223 X |
| 4,390,203 | 6/1983 | Lutz et al. | 296/223 |
| 4,969,681 | 11/1990 | Schleicher et al. | 296/223 |
| 5,104,178 | 4/1992 | Bienert | 296/216 |
| 5,228,743 | 7/1993 | Regner | 296/223 |

FOREIGN PATENT DOCUMENTS

| | | | |
|---|---|---|---|
| 520523 | 12/1992 | European Pat. Off. | 296/223 |
| 2836801 | 3/1980 | Germany | 296/223 |
| 55-87622 | 7/1980 | Japan . | |
| 34520 | 4/1981 | Japan | 296/223 |
| 62-59119 | 3/1987 | Japan . | |

*Primary Examiner*—Dennis H. Pedder
*Attorney, Agent, or Firm*—Finnegan, Henderson, Farabow, Garrett & Dunner

[57]          ABSTRACT

A sun-roof device for use in a vehicle having a roof includes an opening portion formed in the roof and having a pair of parallel spaced side peripheries each of which extends in a lengthwise direction of the vehicle and a front periphery extending in a width direction of the vehicle, a pair of parallel spaced guide rails extending along the pair of side peripheries of the opening portion, respectively, a front frame extending along the front periphery of the opening portion, a movable panel for opening and closing the opening portion, a pair of sliding members for moving the movable panel which are located in the pair of guide rails, respectively, a guide plate fixed to a lower face of the front frame and forming a pair of passages connected to front ends of the pair of guide rails together with the lower face of the front frame, a pair of cables in the pair of passages, respectively and connected to the pair of sliding members, respectively, and a driving member for driving the cables in opposite directions.

13 Claims, 8 Drawing Sheets

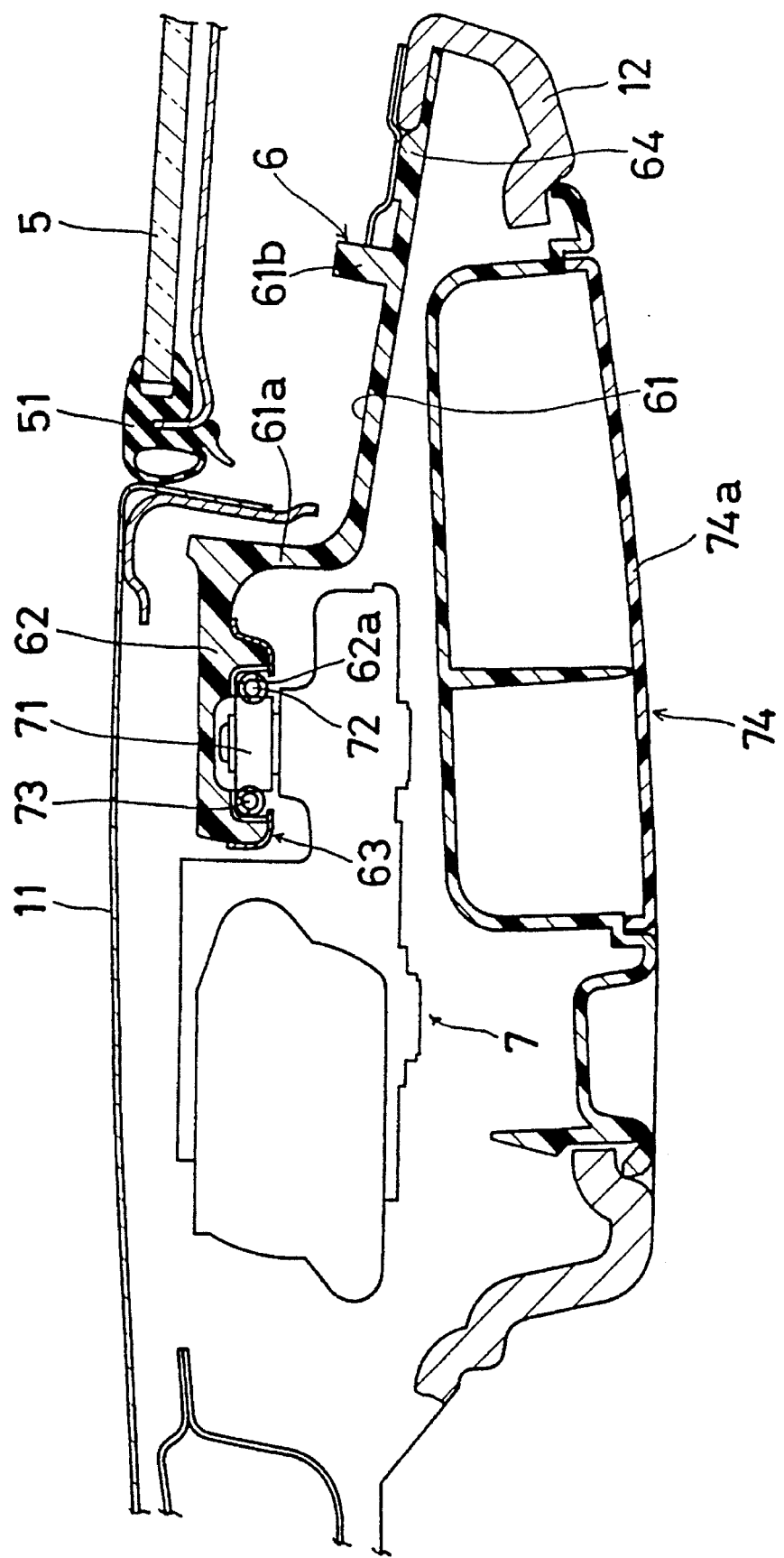

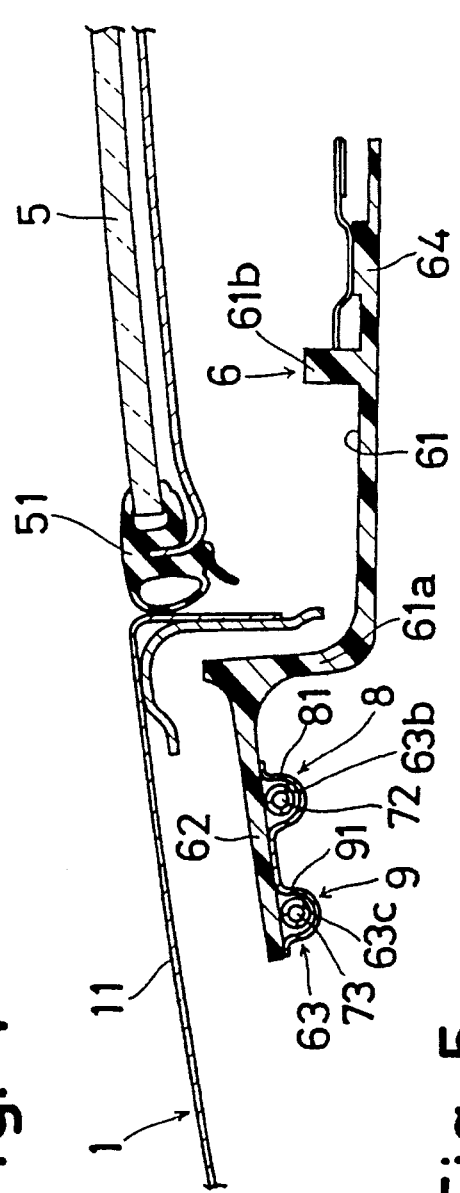
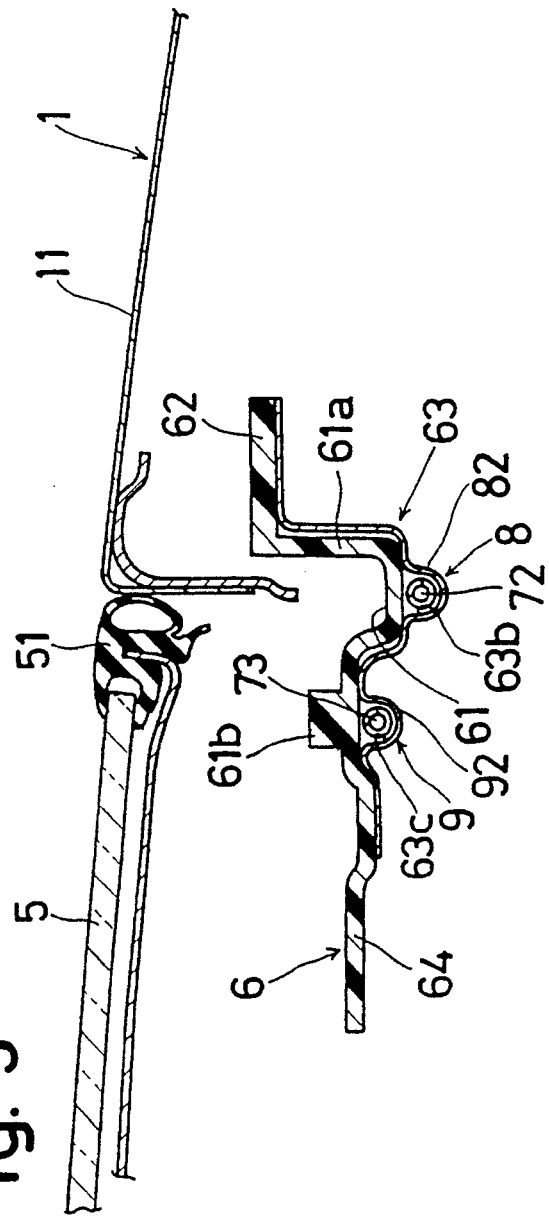

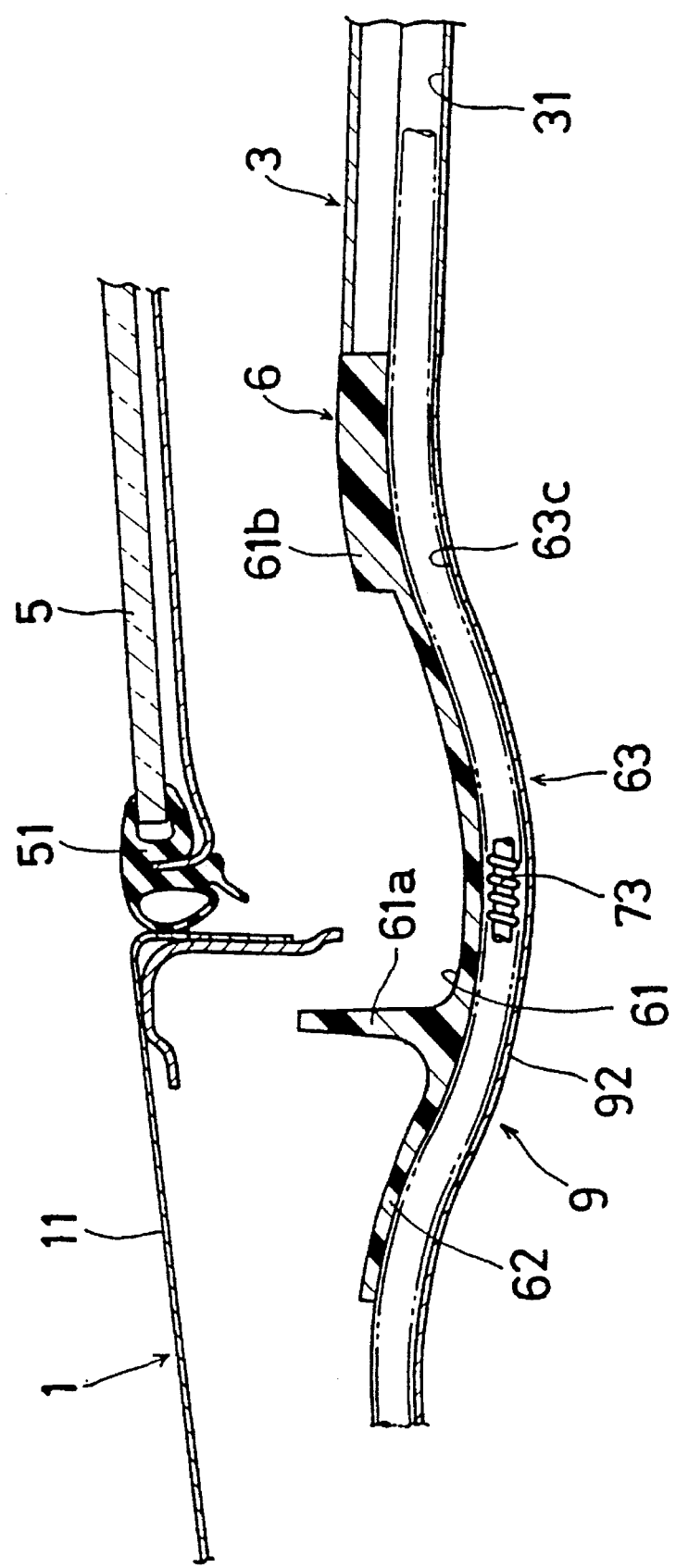

SUN-ROOF DEVICE

BACKGROUND OF THE INVENTION

1. Field of the Invention

The present invention relates to a sun-roof device for use in an automotive vehicle.

2. Description of the Related Art

Conventional sun-roof devices are disclosed in a Japanese utility model application Laid-open publication No.55(1980)-87622 published without examination on Jul. 2, 1980 and a Japanese utility model application Laid-open publication No. 62 (1987)-59119 published without examination on Mar. 14, 1987.

Each of the foregoing sun-roof devices comprises an opening formed in the roof and having a pair of parallel spaced side peripheries each of which extends in a lengthwise direction of the vehicle and a front periphery which extends in the width direction of the vehicle. Each of the devices also includes a pair of parallel spaced guide rails extending along the pair of side peripheries of the opening, respectively, a front frame extending along the front periphery of the opening portion and connecting to front ends of the guide rails, a first gutter extending along the front periphery of the opening portion, and a pair of second gutters extending along the pair of side peripheries of the opening, respectively and being in fluid communication with the first gutter. Each of the devices further includes a movable panel for opening and closing the opening, a pair of link members for moving the movable panel which are located in the pair of guide rails, respectively, and a pair of cables in a pair of passages (discussed later), respectively, and connected to the link members.

In the sun-roof device of the 87622 publication (the '622 device), the passages are defined between an upper face of the front frame and a lower face of a guide plate fixed to the upper face of the front frame. In the sun-roof device of the 59119 publication (the '119 device), the passages are formed by a pair of pipes separated from the front frame.

However, in the '622 device, since the passages for guiding the cables respectively are defined between the upper face of the front frame and the lower face of the guide plate, there is the following drawback.

If a driving member for driving the cables in opposite directions is disposed in a more frontward position than the first gutter, the cables have to cross over the first gutter, so that a fluid-tight joint between the first gutter and each cable has to be established. Thus, it is necessary to locate the driving means at a more rearward position than the first gutter, thereby increasing the thickness of the sun-roof device.

On the other hand, in the '119 device, since the passages are formed by the pipes separated from the front frame, an area in which the driving means is disposed is wider than that of the '622 device, so that the '119 device can overcome the drawback of the former sun-roof device.

However, since the passages of the '119 device are formed by the pipes separated from the front frame, the '119 device is more expensive than the '622 device.

SUMMARY OF THE INVENTION

It is, therefore, an object of the present invention to provide a sun-roof device which overcomes the drawbacks of the prior art.

To achieve the above object and in accordance with the purpose of the invention, as embodied and broadly described herein, the sun-roof device for use in a vehicle having a roof according to the present invention comprises an opening formed in the roof and having a pair of parallel spaced side peripheries each of which extends in a lengthwise direction of the vehicle and a front periphery extending across the vehicle, a pair of parallel spaced guide rails extending along the pair of side peripheries of the opening, respectively, a front frame extending along the front periphery of the opening, a movable panel for opening and closing the opening, a pair of sliding means for moving the movable panel which are located in the pair of guide rails, respectively, a guide plate fixed to a lower face of the front frame and forming together with the lower face of the front frame a pair of passages connected to front ends of the pair of guide rails, a pair of cables in the pair of passages, respectively and connected to the pair of sliding means, respectively, and driving means for driving the cables disposed in opposite directions.

BRIEF DESCRIPTION OF THE DRAWINGS

Additional objects and advantage of the present invention will become more apparent from the following detailed description of the preferred embodiments thereof when considered with reference to the attached drawings, in which:

FIG. 3 is a cross-sectional view taken along line III—III in FIG. 2;

FIG. 4 is a cross-sectional view taken along line IV—IV in FIG. 2;

FIG. 5 is a cross-sectional view taken along line V—V in FIG. 2;

FIG. 6 is a cross-sectional view taken along line VI—VI in FIG. 2;

DETAILED DESCRIPTION OF THE PREFERRED EMBODIMENTS

Hereinafter a sun-roof device according to a first embodiment of the present invention is explained with reference to FIG. 1 to FIG. 9.

Figure 1:
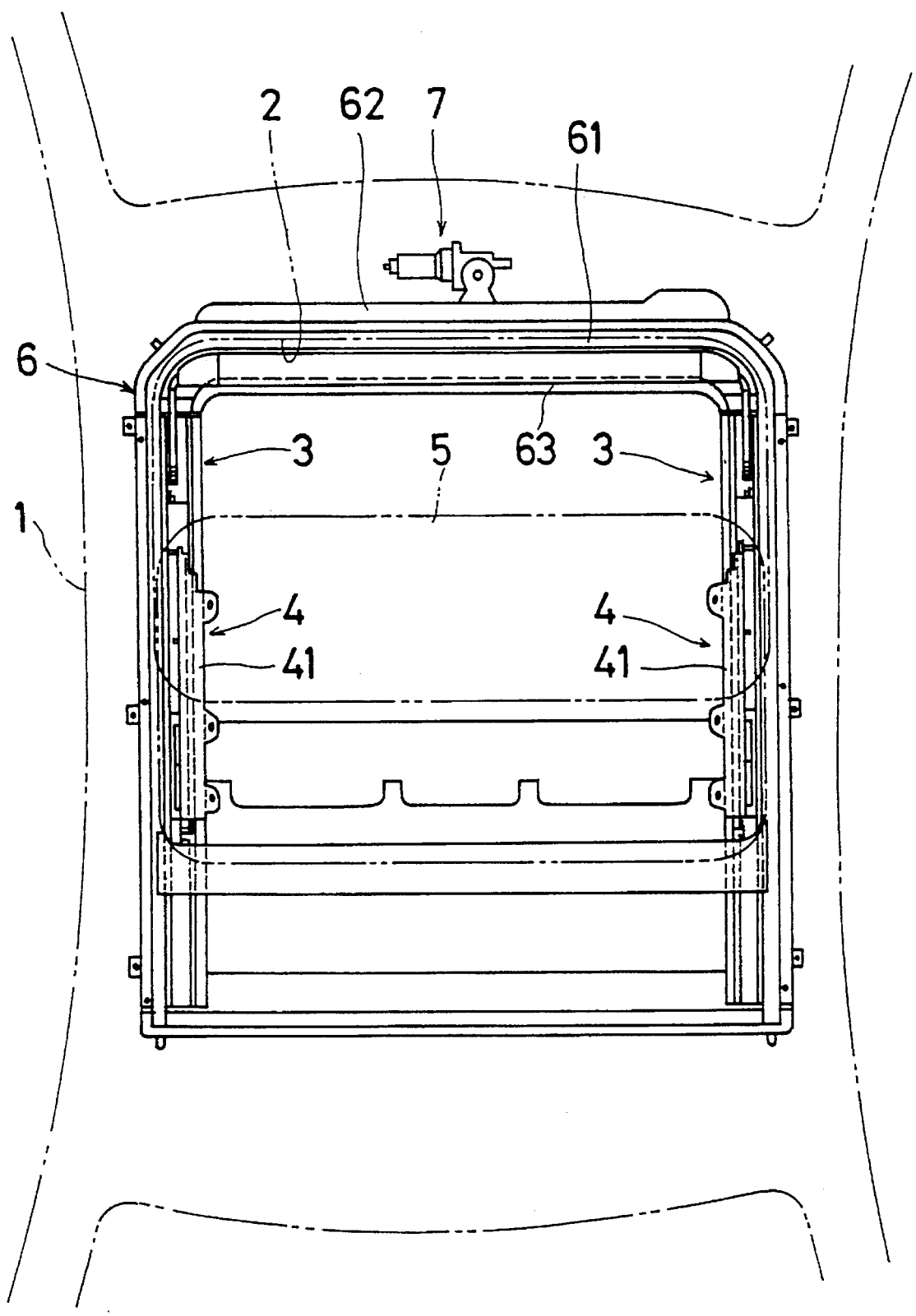
FIG. 1 is a plan view of a sun-roof device according to a first embodiment of the present invention.
Figure 2:
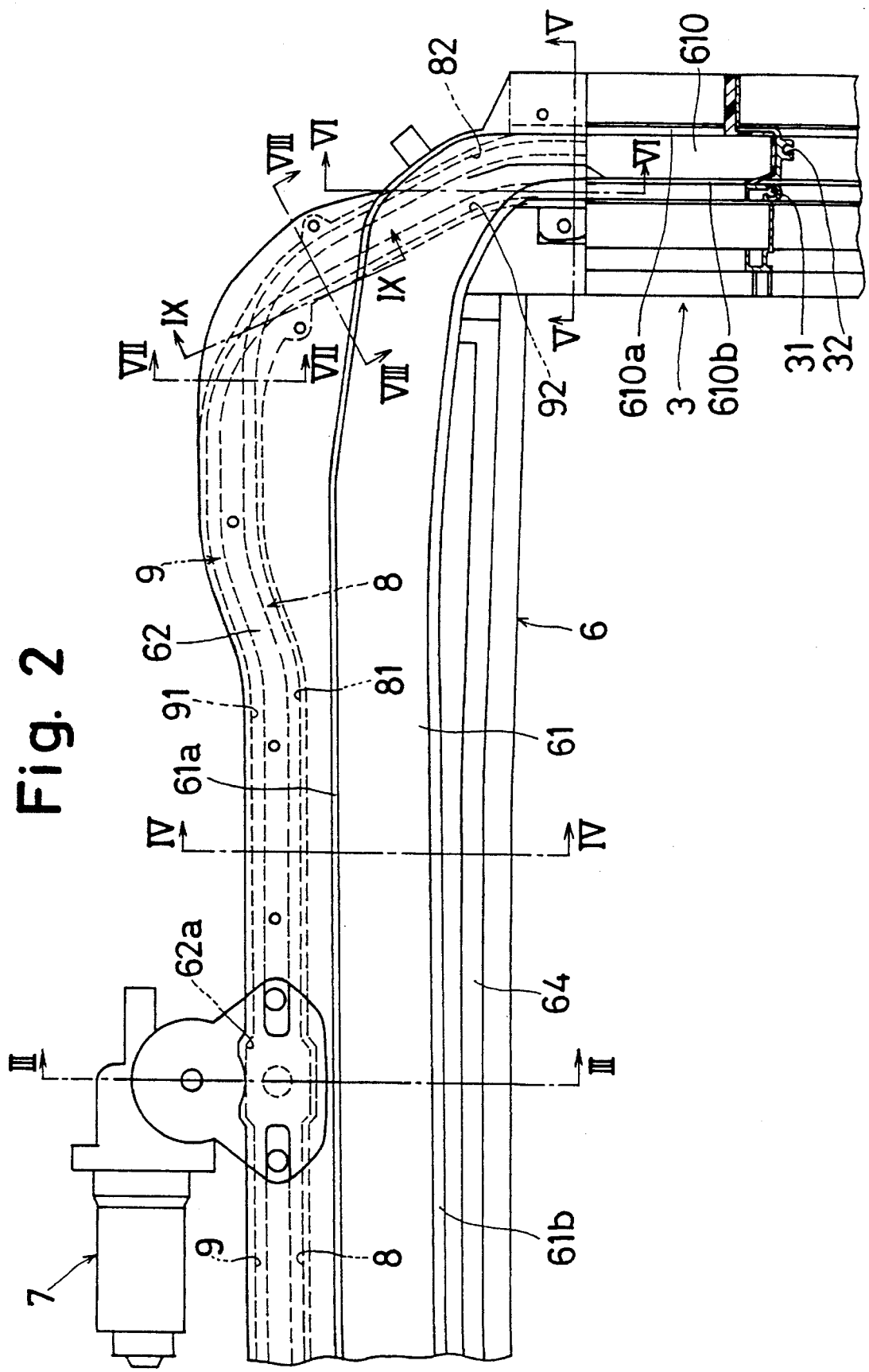
FIG. 2 is an enlarged plan view of the main portion of the sun-roof device shown in FIG. 1.

As shown in FIG. 1 to FIG. 3, a vehicle roof 1 is composed of a roof panel 11 and a vehicle ceiling 12 of the vehicle interior (not shown). An opening 2 is formed in the vehicle roof 1. A pair of guide rails 3,3 made of metal material (e.g. aluminium) extend along the lengthwise direction (front to rear) of a vehicle along both side peripheries of the opening 2. The guide rails 3,3 are located parallel to each other and are fixed to the vehicle roof 1. Hereinafter the guide rail on the right in FIG. 1 is referred to as a first guide rail and the guide rail on the left in FIG. 1 is referred to as a second guide rail.

A sliding panel 5 for opening/closing the opening 2 is supported by a pair of link members 4,4 so as to be slidable toward the front and rear of the vehicle along the guide rails 3,3. One of the link members (hereinafter referred to as the first link member) 4 is guided by the first guide rail 3 so as to be slidable toward the front and rear of the vehicle. The other link member (hereinafter referred to as the second link member) 4 is guided by the guide second rail 3 so as to be slidable in the same direction as the first link member. Each of the link members 4 is composed of a shoe and a link 41.

A front frame 6 made of resin extends along a front periphery of the opening 2 so as to connect the first and second guide rails 3,3. A pair of cables 72,73 are guided by the front frame 6 so as to be moveable in opposite direction to each other. One end of one of the cables (hereinafter referred to as the first cable) 72 is free and the other end of the first cable 72 is connected to the shoe of the second link member 4. One end of the other cable (hereinafter referred to as the second cable) 73 is connected to the shoe of the first link member 4 and the other end of the second cable 73 is free.

A driving member 7 for driving the cables 72,73 is fixed to the front frame 6. The driving member 7 includes of a motor (not shown), a plurality of reduction gears (not shown) and an output gear 71 (shown in FIG. 3). The output gear 71 of the drive member 7 is disposed between the first cable 72 and the second cable 73. Each of the first and second cables 72,73 has a gear portion which is in meshed engagement with the output gear 71 of the driving member 7.

Hereinafter the operation of the foregoing structure is explained. If the motor of the driving member 7 is operated in one direction, the output gear 71 rotates in one direction (e.g. the clockwise direction). This causes the first cable 72 to move in a first direction and the second cable 73 to move in a second direction opposite to the first direction. The shoe of the first link member 4 which is connected to the second cable 73 is moved toward the rear of the vehicle along the first guide rail 3 and the shoe of the second link member 4 which is connected to the first cable 72 is moved in the same direction as the shoe of the first link member 4 along the second guide rail 3. As a result, the sliding panel 5 slides toward the rear of the vehicle, and the opening 2 is opened.

If the motor of the driving member 7 is operated in the other direction, the output gear 71 rotates in the other direction (e.g. in the counterclockwise direction). This cause the first cable 72 to move in the second direction and the second cable 73 to move in the first direction. The shoe of the first link member 4 which is connected to the second cable 73 is moved toward the front of the vehicle along the first guide rail 3 and the shoe of the second link member 4 which is connected to the first cable 72 is moved in the same direction as the shoe of the first link member 4 along the second guide rail 3. As a result, the sliding panel 5 is slides toward the front of the vehicle, and the opening 2 is closed. When the opening 2 is closed by the sliding panel 5, the sliding panel 5 abuts the roof panel 11 via a seal member 51 (shown in FIG. 3).

As shown in FIG. 2, a first gutter portion 61 is formed with the front frame 6 so as to extend in the width direction of the vehicle below the front periphery of the opening 2 (or a border portion between the roof panel 11 and the sliding panel 5 in the closed position of the sliding panel 5). The first gutter portion 61 is formed by a front upstanding wall 61a and a rear upstanding wall 61b.

A pair of second gutter portions 610,610 (only one of the second gutter portions 610 is shown in FIG. 2) are formed integrally with the first and second guide rails 3,3 so as to extend in the front and rear direction of the vehicle below both side peripheries of the opening 2 (or a border portion between the roof panel 11 and the sliding panel 5 in the closed position of the sliding panel 5). Each of the second gutter portions 610 is formed by an outside upstanding wall 610a and a inside upstanding wall 610b. The second gutter portions 610,610 are in communication with the first gutter portion 61.

As shown in FIG. 3, the front upstanding wall 61a is disposed between the roof panel 11 and the vehicle ceiling 12 so as to be located in a little more frontward position than the front periphery of the opening 2. The rear upstanding wall 61b is located in a little more rearward position than the front periphery of the opening 2. The front upstanding wall 61a is higher than the rear upstanding wall 61b.

A first flange portion 62 is formed with an upper portion of the front upstanding wall 61a so as to project toward the front of the vehicle from the upper portion of the front upstanding wall 61a. The first flange portion 62 is disposed between the roof panel 11 and the vehicle ceiling 12. The first flange portion 62 extends in the width direction of the vehicle.

The driving member 7 is supported by the first flange portion 62. The driving means 7 is disposed between the roof panel 11 and the vehicle ceiling 12 in such a manner that one portion of the driving means 7 is located in a more frontward position than the first flange portion 62 and the other portion of the driving means 7 is located below the first flange portion 62.

A second flange portion 64 is formed with a lower portion of the rear upstanding wall 61b so as to project toward the rear of the vehicle from the lower portion of the rear upstanding wall 61b. The vehicle ceiling 12 is fixed to the second flange portion 64.

An operator box 74 by which the driving member 7 is driven is fixed to the vehicle ceiling 12 so as to be located below the driving means 7. An operator portion 74a of the operator box 74 is exposed to the vehicle inner room.

As shown in FIG. 2, each guide rail 3 has first and second guide grooves 31,32. A first guide groove 31 of the first guide rail 3 for guiding the shoe of the first link member 4 is located in a more inside position than one of the inside upstanding walls 610b. A first guide groove 31 of the second guide rail 3 for guiding the shoe of the second link member 4 is located in a more inside position than the other inside upstanding wall 610b. A second guide groove 32 of the first guide rail 3 is located in a more outside position than the first guide groove 31 of the first guide rail 3. A second guide groove 32 of the second guide rail 3 is located in a more outside position than the first guide groove 31 of the second guide rail 3.

The connected end of the first cable 72 connected to the shoe of the second link member 4 is slidably guided by the first guide groove 31 of the second guide rail 3 and the connected end of the second cable 73 connected to the shoe of the first link member 4 is slidably guided by the first guide groove 31 of the first guide rail 3. The free end of the first cable 72 is slidably guided by the second guide groove 32 of the first guide rail 3 and the free end of the second cable 73 is slidably guided by the second guide groove 32 of the second guide rail 3.

As shown in FIG. 3, a concave portion 62a is formed in a part of a lower face of the first flange portion 62. The output gear 71 of the driving member 7 and the cables 72,73 are disposed in the concave portion 62a.

As shown in FIG. 2 to FIG. 9, a guide plate 63 made of metal material is fixed to the lower face of the first flange portion 62 so as to form a pair of first passages 8,8 and a pair of second passages 9,9 together with the lower face of the first flange portion 62. The first cable 72 is slidably guided by the first passages 8,8 and the second cable 73 is slidably guided by the second passages 9,9. As shown in FIG. 3, a portion of the guide plate 63 which is opposed to the concave portion 62a is notched.

As shown in FIG. 2, one end of one of the first passages (hereinafter referred to the first right passage) 8 is in communication with the concave portion 62a and the other end of the first right passage 8 is in communication with the second guide groove 32 of the first guide rail 3. One end of one of the second passages (hereinafter referred to the second right passage) 9 is in communication with the concave portion 62a and the other end of the second right passage 9 is in communication with the first guide groove 31 of the first guide rail 3.

The first right passage 8 and the second right passage 9 cross each other without being in communication therewith. The first right passage 8 is located in parallel with the second right passage 9 except for the crossing portion at which both the first right passage 8 and the second right passage 9 cross each other (hereinafter referred to as the crossing portion) and the area near the crossing portion.

One end of the other first passage 8 (hereinafter referred to as the first left passage) is in communication with the concave portion 62a and the other end of the first left passage 8 is in communication with the first guide groove 31 of the second guide rail 3 (shown in FIG. 1). One end of the other second passage (hereinafter referred to as the second left passage) 9 is in communication with the concave portion 62a and the other end of the second left passage 9 is in communication with the second guide groove 32 of the second guide rail 3 (shown in FIG. 1). The first left passage 8 is located in parallel with the second left passage 9 from one end of the first left passage 8 to the other end of the first left passage 8.

As shown in FIG. 4, a first parallel portion 81 of the first right passage 8 located from one end of the first right passage 8 to the area near the crossing portion is formed in such a manner that an opening portion of the first concave portion 63b formed in the guide plate 63 is closed by the lower face of the first flange portion 62. A first parallel portion 91 of the second right passage 9 located in parallel with the first parallel portion 81 is formed in such a manner that an opening portion of a second concave portion 63c formed in the guide plate 63 is closed by the lower face of the first flange 62.

As shown in FIG. 5 and FIG. 6, a second parallel portion 82 of the first right passage 8 located from the other end of the first right passage 8 to the area near the crossing portion is formed in such a manner that the opening portion of the first concave portion 63b is closed by the lower face of the first gutter 61. A second parallel portion 92 of the second right passage 9 located in parallel with the second parallel portion 82 is formed in such a manner that the opening portion of the second concave portion 63c is closed by the lower face of the first gutter 61.

Figure 7:
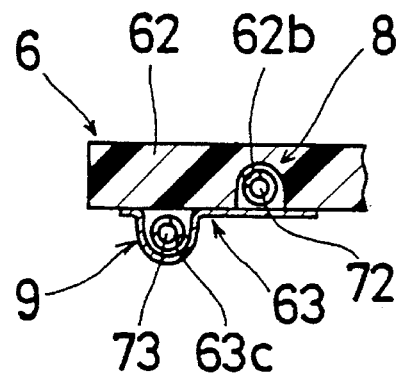
FIG. 7 is a cross-sectional view taken along line VII—VII in FIG. 2.
Figure 8:
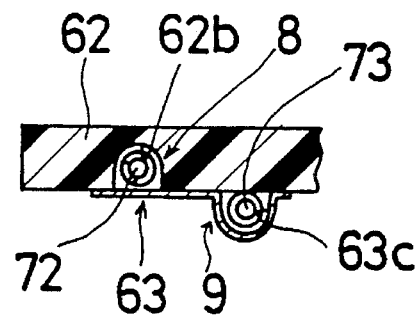
FIG. 8 is a cross-sectional view taken along line VIII—VIII in FIG. 2.

As shown in FIG. 7 and FIG. 8, the first right passage 8 which is located in the area near the crossing is formed in such a manner that an opening portion of a concave portion 62b formed in the lower face of the first flange 62 is closed by the upper face of the guide plate 63. The second right passage 9 in the area near the crossing portion is formed in such a manner that the opening portion of the second concave 63c is closed by the lower face of the first flange portion 62.

Figure 9:
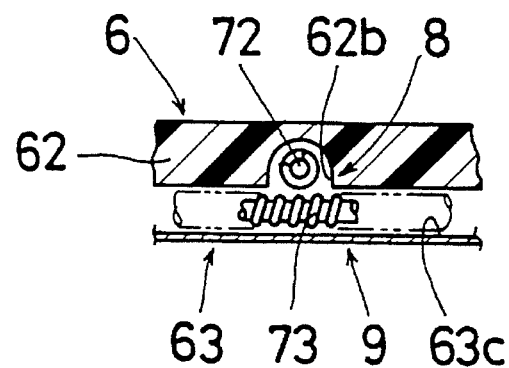
FIG. 9 is a cross-sectional view taken along line IX—IX in FIG. 2.

As shown in FIG. 9, the first right passage 8 in the crossing portion is formed by the concave portion 62b of the first flange portion 62. The second right passage 9 in the crossing portion is formed by the second concave portion 63c of the guide plate 63.

According to the foregoing structure, the free end of the first cable 72 is slidably guided from the concave portion 62a to the second guide groove 32 of the first guide rail 3 via the first concave portion 63b, the concave portion 62b and the first concave portion 63b (or the first right passage 8). The connected end of the second cable 73 connected to the shoe of the first link member 4 is slidably guided from the concave portion 62a to the first guide groove 31 of the first guide rail 3 via the second concave portion 63c (or the second right passage 9).

Further, the connected end of the first cable 72 connected to the shoe of the second link member 4 is slidably guided from the concave portion 62a to the first guide groove 31 of the second guide rail 3 via the first concave portion 63b (or the first left passage 8). The free end of the second cable 73 is slidably guided from the concave portion 62a to the second guide groove 32 of the second guide rail 3 via the second concave portion 63c (or the second left passage 9).

Thus, in the first embodiment, as the passages 8,9 for guiding the cables respectively are formed by the guide plate 63 and the front frame 61, the sun-roof device according to the first embodiment is less costly than the conventional sun-roof device in which a pair of pipes is used.

Further, since the passages 8,9 are formed by the lower face of the front frame 61 and the upper face of the guide plate 63 fixed to the lower face of the front frame 61, an area in which the driving member 7 is disposed is wider than that of the conventional sun-roof device having the guide plate fixed to the upper face of the front frame. In other words, if the driving member 7 is disposed in a more frontward position than the first gutter portion 61 (or the front periphery of the opening 2), the passages 8,9 won't cross the first gutter portion 61. Therefore, since the driving member 7 can be disposed in more frontward position than the first gutter portion 61, the sun-roof device according to the first embodiment is thinner than the conventional sun-roof device having the guide plate fixed to the upper face of the front frame.

Further, since the passages 8,9 are formed by the lower face of the flange portion 62 projected toward the front of the vehicle from the upper portion of the front upstanding wall 61a and the upper face of the guide plate 63, the distance between the roof panel 11 and a lower face of the driving means 7 is shorter than using the flange portion 62 projected from the lower portion of the front upstanding wall 61a. Therefore, an area of the space between the roof panel 11 and the vehicle ceiling 12 in which the driving means is disposed is smaller.

Further, as the passages are formed by a concave portion 62b formed in the lower face of the flange portion 62 or a pair of concave portion 63b,63c formed in the upper face of the guide plate 63, the cables 72,73 can cross each other without increasing a thickness of the sun-roof device.

Further, as the cables 72,73 can cross each other, the guide grooves 32,32 of the guide rails 3,3 can be located outside the side peripheries of the opening 2. As a result, a head clearance of the inner room of the vehicle is not decreased.

Figure 10:
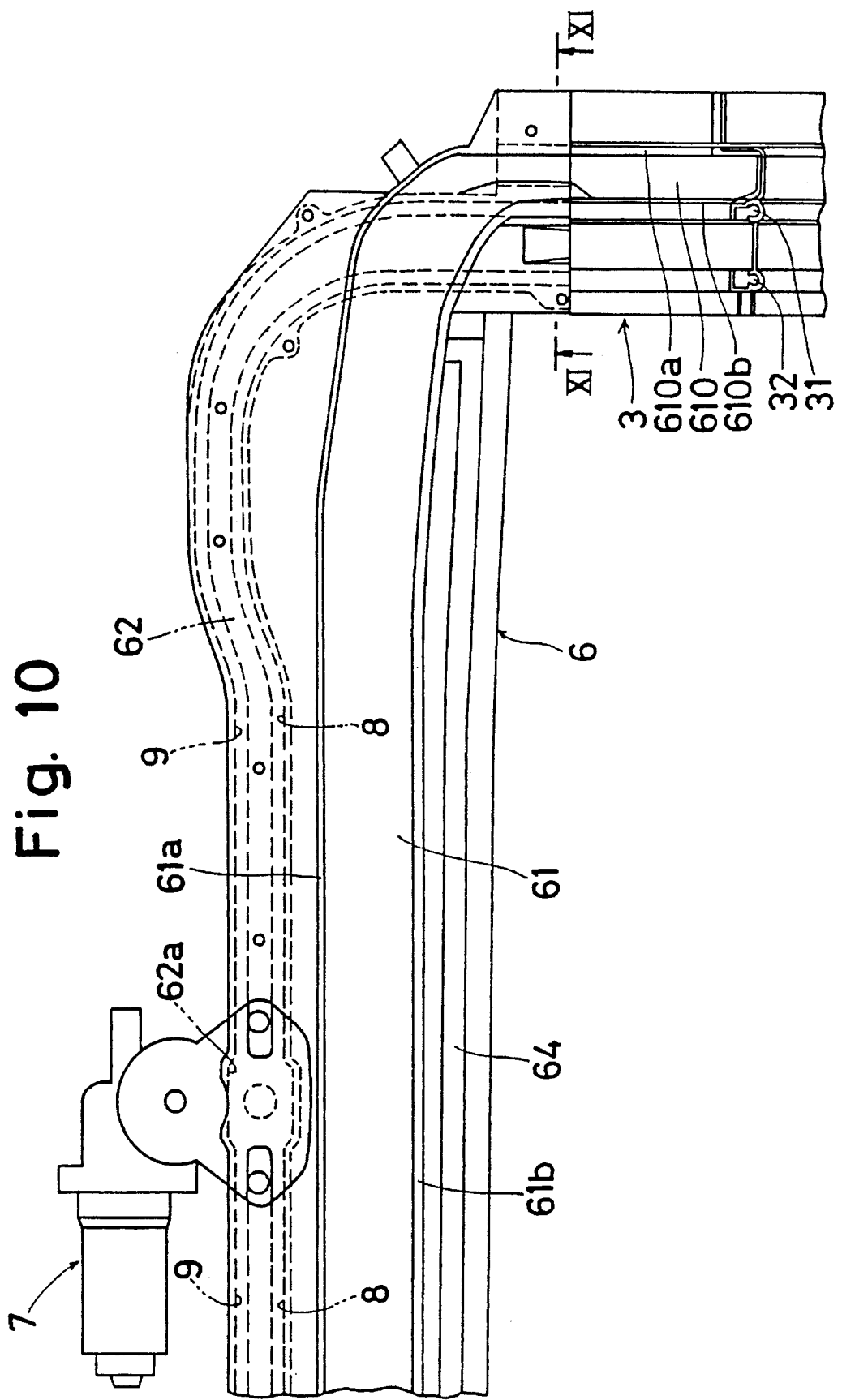
FIG. 10 is an enlarged plan view of a main portion of a sun-roof device according to a second embodiment of the present invention.
Figure 11:
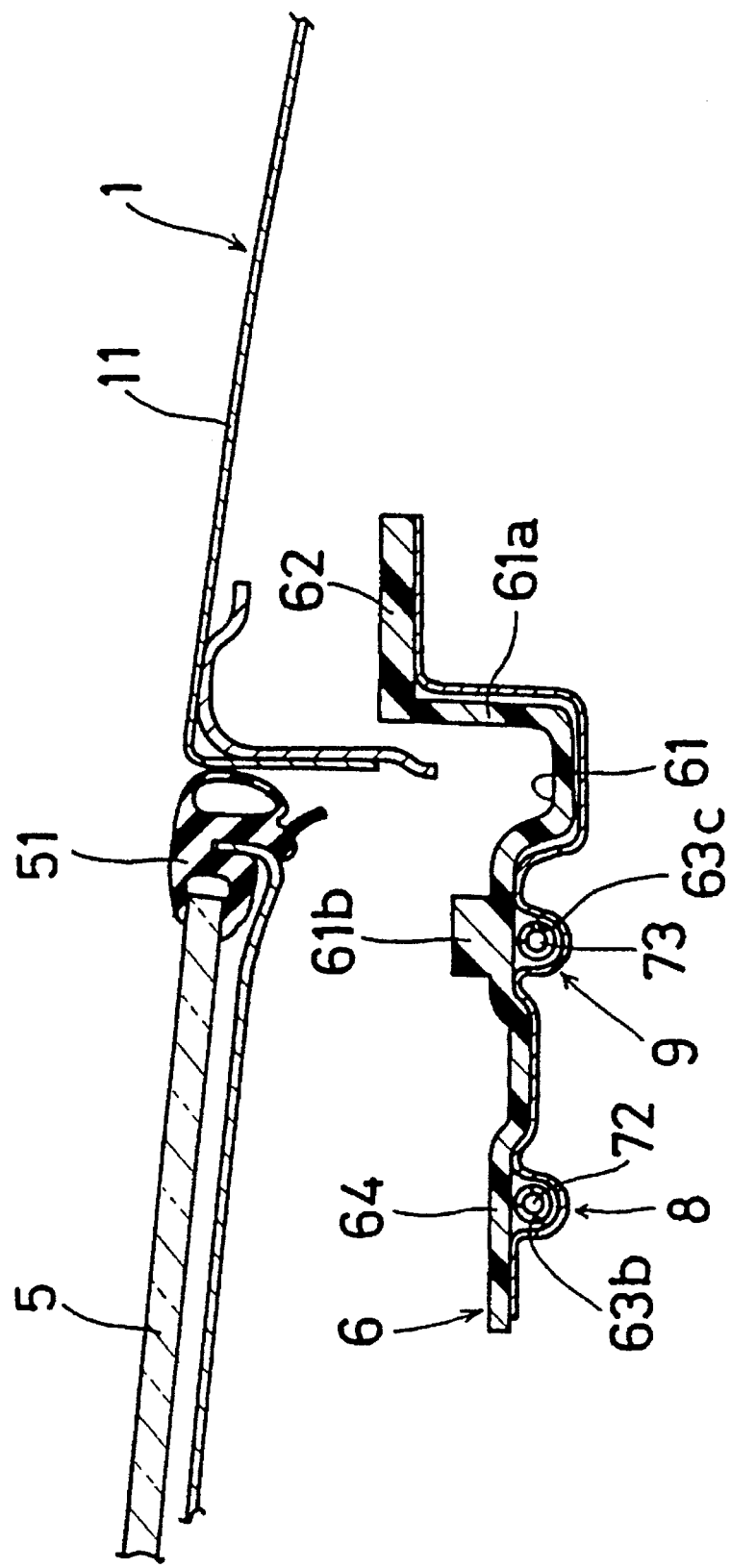
FIG. 11 is a cross-sectional view taken along line XI—XI in FIG. 10.

A second embodiment of the present invention is explained referring to FIG. 10 and FIG. 11. The same members as the first embodiment are shown in the same reference numbers as the first embodiment and the explanation thereof is omitted.

As shown in FIG. 10 and FIG. 11, the first and second cable 72,73 are not crossing each other. The first right passage 8 and the second right passage 9 are not crossing each other as well as the first left passage 8 and the second left passage 9. Both of the first passages 8,8 are formed in such a manner that the first concave portion 63b formed in the guide plate 63 is closed by the lower face of the first flange portion 62. Both of the second passages 9,9 are formed in such a manner that the second concave portion 63c formed in the guide plate 63 is closed by the lower face of the first flange portion 62.

The preferred embodiments described herein are therefore illustrative and not restrictive, the scope of the invention being indicated in the appended claims and all variations which come within the meaning of the claims are intended be embraced therein.

What is claimed is:

1. A sun-roof device for use in a vehicle having a roof comprising:

an opening formed in the roof and having a pair of parallel spaced side peripheries each of which extends in a lengthwise direction of the vehicle and a front periphery extending across the vehicle;

a pair of parallel spaced guide rails extending along the pair of side peripheries of the opening, respectively;

a front frame extending along the front periphery of the opening;

a movable panel for opening and closing the opening;

a pair of sliding means for moving the movable panel which are located in the pair of guide rails, respectively;

a guide plate fixed to a lower face of the front frame and forming together with the lower face of the front frame a pair of passages bounded by said lower face and the guide plate, the passages being connected to front ends of the pair of guide rails;

a pair of cables disposed in the pair of passages, respectively; and driving means for driving the cables in opposite directions.

2. A sun-roof device as set forth in claim 1, wherein a flange portion is provided at a forward end of the front frame and the pair of passages are provided at the flange portion.

3. A sun-roof device as set forth in claim 2, wherein in a predetermined portion of the front frame the pair of passages are respectively formed by a concave portion in the lower face of the flange portion and a concave portion in the upper face of the guide plate.

4. A sun-roof device as set forth in claim 2, including a front upstanding wall formed integrally with the front frame, and having an upper portion, and wherein the flange portion projects in the forward direction of the vehicle from said upper portion.

5. A sun-roof device as set forth in claim 4, including a rear upstanding wall formed integrally with the front frame, and wherein a gutter is formed by the front upstanding wall and said rear upstanding wall.

6. A sun-roof device as set forth in claim 1, wherein the pair of passages cross each other.

7. A sun-roof device as set forth in claim 1, wherein the pair of passages are parallel.

8. A sun-roof device for use in a vehicle having a roof comprising:

an opening formed in the roof and having a pair of parallel spaced side peripheries each of which extends in a lengthwise direction of the vehicle and a front periphery extending across the vehicle;

a pair of parallel spaced guide rails extending along the pair of side peripheries of the opening, respectively;

a front frame extending along the front periphery of the opening;

a first gutter extending along the front periphery of the opening;

a pair of second gutters extending along the pair of side peripheries of the opening, respectively and abutting the first gutter;

a movable panel for opening and closing the opening;

a pair of sliding means for moving the movable panel which are located in the pair of guide rails, respectively and which are located inwardly relative to the pair of second gutters, respectively;

a guide plate fixed to a lower face of the front frame and forming together with the lower face of the front frame a pair of passages bounded by said lower face and the guide plate, the passages being connected to front ends of the pair of guide rails;

a pair of cables disposed in the pair of passages, respectively; and driving means for driving the cables in opposite directions, said driving means mounted at a front portion of the vehicle roof so as to be located forward of the first gutter.

9. A sun-roof device as set forth in claim 8, wherein a flange portion is provided at a forward end of the front frame so as to be located more forward than the first gutter and the pair of passages are provided at the flange portion.

10. A sun-roof device as set forth in claim 9, including a front upstanding wall of the first gutter portion, and having an upper portion, and wherein the flange portion projects in the forward direction of the vehicle from said upper portion.

11. A sun-roof device as set forth in claim 9, wherein in a predetermined portion of the front frame the pair of passages are respectively formed by a concave portion in the lower face of the flange portion and a concave portion in the upper face of the guide plate.

12. A sun-roof device as set forth in claim 8, wherein the pair of passages cross each other.

13. A sun-roof device as set forth in claim 8, wherein the pair of passages are parallel.

* * * * *